United States Patent [19]
Amon et al.

[11] Patent Number: 5,960,413
[45] Date of Patent: Sep. 28, 1999

[54] PORTABLE SYSTEM FOR INVENTORY IDENTIFICATION AND CLASSIFICATION

[76] Inventors: James A. Amon, 134 Bridle View Way, Souderton, Pa. 18964; William R. Holler, 425 Brighton St. #403, Bethlehem, Pa. 18015

[21] Appl. No.: 08/611,999

[22] Filed: Mar. 5, 1996

[51] Int. Cl.$^6$ ................................................... G06F 17/60
[52] U.S. Cl. .......................... 705/28; 235/385; 356/375; 364/400
[58] Field of Search ........................... 235/385; 340/568; 356/375; 364/400, 478.01, 478.02, 516; 382/141; 395/228; 705/28

[56] References Cited

U.S. PATENT DOCUMENTS

| | | | |
|---|---|---|---|
| 3,426,326 | 2/1969 | Goldstein | 340/825.35 |
| 4,796,209 | 1/1989 | Burk | 364/559 |
| 4,827,395 | 5/1989 | Anders et al. | 364/138 |
| 4,956,794 | 9/1990 | Zeevi et al. | 364/559 |
| 5,297,061 | 3/1994 | Dementhon et al. | 364/559 |
| 5,307,294 | 4/1994 | Aman et al. | 364/560 |
| 5,393,970 | 2/1995 | Shau et al. | 250/206.2 |
| 5,517,429 | 5/1996 | Harrison | 364/516 |
| 5,576,972 | 11/1996 | Harrison | 364/516 |

Primary Examiner—Edward Cosimano

[57] ABSTRACT

The prior art invention entitled Automated End Tally System, has been augmented to include either a scanning radar unit (22c) or a phased array scanning radar unit (42c), for the purposes of additionally obtaining unit interior topological information. Such interior information is required to determine an accurate tally count in the case where two or three boards such as (13), (14), and (15), have been longitudinally aligned to span the entire board row (11b) of a given coarse (10b) (a technique referred to as "nesting"). In the case of scanning radar unit (22c), this additional interior topology information is gathered by emitting a focused pulsed incident scanning energy beam (38a), which is of an energy chosen to be transmissive to paper wrap materials (8) which might be covering unit (10) and to the lumber of unit (10) itself. As beam (38a) transmits through "nested" boards such as (13) and (14) it will encounter a board row break such as (16) where the two boards are abutted. Either board end (13b) or (14a), which define this break, will have been previously demarcated during unit construction by a reflective material. This reflective marking (16a) will cause the incident beam (38a) to reflect back towards scanning radar unit (22c) as reflective beam (38b). The reflective information obtained by unit (22c) is input to the unit interior topological processor (22d) which then determines the three dimensional locations of all board row breaks within lumber unit (10) which is communicated to computer (28). Computer (28) then combines this interior end surface information with the exterior information to provide a precise tally count of unit (10).

120 Claims, 3 Drawing Sheets

PORTABLE SYSTEM FOR INVENTORY IDENTIFICATION AND CLASSIFICATION

RELATED APPLICATIONS

Automated End Tally System—U.S. Pat. No. 5,307,294

Automated Lumber Unit Tracking System U.S. Pat. No. 5,604,715

FIELD OF INVENTION

The present invention relates to portable systems for providing information regarding inventoried objects.

DESCRIPTION OF PRIOR ART

Lumber is most often transferred from primary manufacturer, to wholesaler and finally to retailer in bundled units. These units typically consist of lumber which is always of the same thickness but may vary in width and length. Units are constructed by stacking several layers of uniform width, called courses, on top of each other. Each course consists of several boards laid side by side. Typically, these units are constructed to be approximately four feet high by four feet wide by six to twenty feet long. These dimensions ensure that the unit may easily be transported by fork lift and other road vehicles. The lumber mill and especially the wholesaler may inventory hundreds of these lumber units at any given time. This requires that they maintain open yards where these units are segregated into like groups for easier location tracking and inventory control.

Any given unit of lumber may differ from any other given unit in several ways. First, it may be of a different specie, for example oak versus pine, or a different grade, for example "C" versus "C & better" or "B". In addition to these features, the boards within the units may also differ by width and length. Some lumber units may be green while others are dry. The boards in a given unit may all be rough, surfaced one side, two sides or on all four sides. Their ends may or may not be trimmed and they may or may not have surface patterns. Furthermore, lumber with the same specie, grade and thickness may be purchased from different mills and therefore may differ slightly in quality. These slight variations may be of importance to the wholesaler's customers. Lumber units are also received on different days and typically vary in age. Since all lumber tends to loose quality over time, it is important to the wholesaler to be able to identify the age of each unit. Because of all of these types of variations and more, lumber wholesalers have developed the practice of marking each unit. They will either write with a marker on the side of one of the exposed boards for easy viewing and/or they will also create a paper tag to be attached to the unit. Unfortunately, each of these two methods have significant drawbacks.

First the outer surfaces of most boards do not make ideal writing surfaces and hence the markings which are all hand made may become illegible. It is also not practical to write a great amount of information, such as the original mill, received date or tally count of boards in the unit, on the side of one single board. Typically the information may just include specie, grade and perhaps thickness. Second, the use of paper tags, while they are not a poor writing surface, do present their own problems. For instance, tags may fade over time and/or they may fall off. Being made of special weather resistant paper, they do add additional material cost, not to mention the labor costs of writing up the tags. When units of lumber are opened and mixed with lumber from other units to create new units, they often must be re-tagged thereby taking additional time and paper costs. Both methods, whether writing on the unit or tagging have the additional problem of not always being in a convenient location on the unit for later identification. For example, lumber units are often stacked four or five units high, several rows deeps, either in an open air yard or preferably in a shed of some sort. In these cases, the marking or tag on these units may not be easy to find and/or read.

The very nature of the aforementioned problem makes it difficult to maintain a computer based inventory control system which can accurately track the detailed characteristics of all units. Additionally, the constant movement of units makes it cost prohibitive to manually track the exact locations of each and every unit in the lumber yard at all times. There have traditionally been no methods of tracking this type of detail regarding individual units along with their current locations. The present inventors have previously submitted a patent application referred to as an Automated Lumber Unit Tracking System, U.S. Pat. NO. 5,604,715. This system follows the movements of individual fork lifts as they engage, transport and disengage units throughout a yard. By doing this, an automated information system is established to track and record the exact location of each and every unit in a lumber yard and its sheds at any given instant. This information may then be associated with the characteristics of each unit thereby maintaining a complete database which is constantly available for operator inquiry. However, the current state of the art would require that the operator either enter some identifying indicia to the computer system or have the unit engaged by a fork lift in order to retrieve the desired unit information. Rather than relying upon either of these two methods, the present inventors propose allowing the yard man to use a hand held device to remotely identify units based upon their location, after which all related unit information is provided on an LCD screen. It is further proposed that the present invention allow a yard man to classify a unit which has not yet had its location identified to a tracking system. This would be done by capturing the units image along with its current location and sending this to the remote tracking system for storage in its tracking database. At this same time, the operator could also enter any identifying indicia that may be on the unit by either using the keyboard or microphone.

SUMMARY OF THE INVENTION

The present invention utilizes a similarly constructed omni-directional signal tracking system as disclosed in the aforementioned Automated Lumber Unit Tracking System patent application incorporated herewith along with a portable hand held device. The hand held device is in constant communication with a data base containing the location of each lumber unit within the yard along with the corresponding lumber characteristics. The tracking system determines the location of the portable device at all times. The device comprises an LCD screen and small keyboard as well as electronic orientation and range finding devices. The device further comprises a visible laser pointer. A particular lumber unit is selectively identified by shinning the visible laser beam onto any surface of the desired unit thereby creating a visible spot on the chosen unit. The exact position of the spot based upon the known coordinates and orientation of the hand held device as well as the distance to the spot is then calculated. This information would then be passed to the computer system which is used to track each individual unit. The current unit could then be identified and all known information would then be transmitted back to the hand held for display on the LCD screen for review by the yard man. Such information could include all of the above mentioned specifications including specie, grade, thickness, width, length, dryness, surfacing etc. and could also include mill, received date, current tally, out of kiln date, moisture content, as well as who last transported the unit to this particular location. This system, if combined with order processing office computer software, could also tell the yard man if any of his customers are looking for such a unit.

Such a device would eliminate the need to mark or tag any unit thereby saving both material and labor costs. If the yard man can see a unit, he will be able to project a spot on the unit and therefore will have the ability to easily identify it. If the tally changes during repacking, there is no need to re-tag. Furthermore, it is anticipated that such a device may also be used to help find a desired unit by using the LCD screen to direct the yard man to the unit.

Additionally, in the normal course of business, stacks of lumber units may fall to the ground. The bands around the units may then also break such that the boards of several fallen units mix together. In this case, there is no unique lumber unit to identify. To resolve this problem, the operator will place the present invention within the "space" that was occupied by any one of the fallen units and then initiate the inquiry sequence without first doing a range find operation. Hence, the associated unit tracking system would then feed back the last known unit to occupy the current location of the portable device, rather than the location of the projected spot. The system also determines that the device was effectively within the interior of the "space" of the last known unit. Knowing this, the system assumes that the unit has fallen and also reports on any units which may have occupied the "space" above the current unit. Such simplicity is also useful for units which have not fallen. The device operator could point at a single unit, get its identity from the tracking system, and then use an up or down arrow key on the device key pad to request the identity of the unit above or below the present unit.

Finally, in those cases where a particular unit has not yet been "located" by the use of a system such as fork lift tracking, the present invention will allow the operator to easily classify the unit. This would be accomplished by using the portable device to place a spot on one of the unit's exposed surfaces while at the same time either entering or speaking a command to direct the device to capture the current image. The operator would then also either enter or speak into the portable device the uniquely identifying code (if there is one) for the unit in question. All of this information would then be passed to the tracking computer system which would then be able to calculate the location of the spot as well as the size of the unit's surface. This location information would then be associated with the entered unit code so that any pertinent information contained on the companion office computer system could then be related to the newly located tag.

The present inventors are not aware of any other portable devices, of any kind, capable of working with a tracking system to identify and or classify individual units. Nor are the present inventors aware of any device capable of remotely identifying a unit simply based upon its location.

OBJECT AND ADVANTAGES

Accordingly, the objects and advantages of the present invention are:

1. To provide a portable device which can be carried about by an operator and used to recall information regarding any desired object within a group of inventoried objects;
2. to provide a system where the operator may simply point at the desired object in order to identify it to the system;
3. to provide a system for identifying objects within a group, where the objects are not required to bear any indicia;
4. to provide a system where the operator may hold the portable device in an area once occupied by an object, as in the case where it has fallen or has been displaced, in order to identify it to the system;
5. to provide a system which can capture the current location, image and uniquely identifying code (if one exists) of a unit which has not yet been tracked so that it may then be tracked and classified by the accompanying computer systems; and
6. to provide a system where the operator has a minimum number of commands that need to be entered via keyboard for identifying inventoried objects and retrieving related information.

Further objects and advantages are to provide a system with a minimum of moving parts capable of withstanding a large variation of environmental conditions. Still further objects and advantages of the present invention will become apparent from the consideration of the drawings and ensuing description.

Specification

Figure 1:
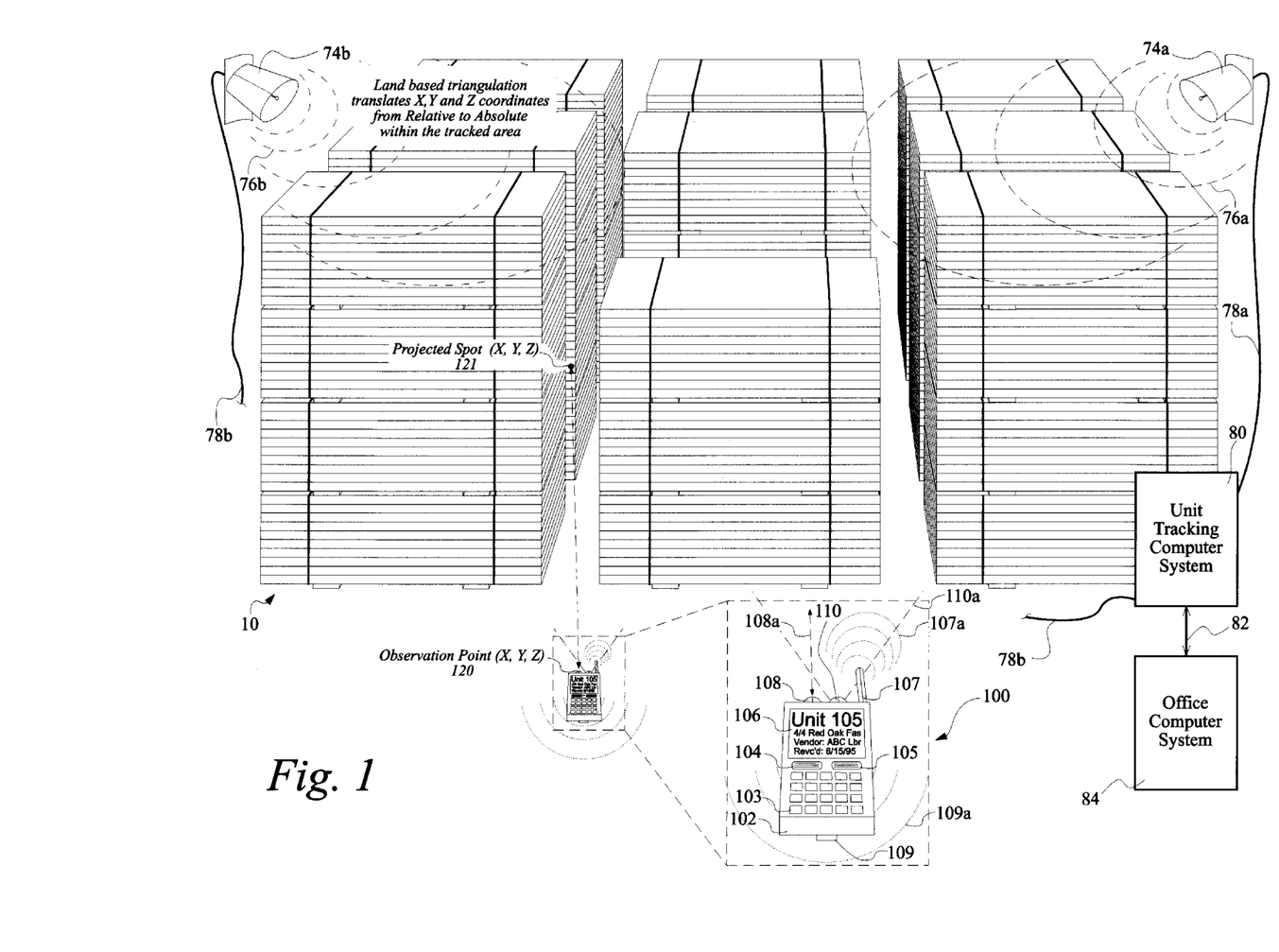
FIG. 1 is a perspective diagram of the present invention showing the proposed portable device being used to spot and identify a specific lumber unit from amongst several units stacked in rows.

Referring to FIG. 1 there is shown a perspective drawing of the present invention of the portable observation point device 100 along with several stacked rows of lumber units similar to 10. It is presumed that the units such as 10, have been tracked to their current resting positions by a system similar to the Automated Lumber Unit Tracking System, Ser. No. 08/5,604,715, as previously disclosed by the present inventors. Comprising such a system, and also incorporated into the present invention, is office computer system 84, which stores pertinent information related to each unit such as 10 as may have been previously input by human effort or gathered by devices similar to the Automated End Tally System, U.S. Pat. No. 5,307,294, as previously disclosed by the present inventors. Computer system 84 is capable of bi-directional communications with unit tracking computer system 80 via data link 82. Tracking computer system 80 further connects with two or more stationary elevated locating modules such as 74a and 74b, via wires 78a and 78b respectively. Modules 74a and 74b are constantly emitting tracking and information signals 76a and 76b which are then capable of being received by tracking antenna 107 on device 100. Antenna 107 itself is also capable of emitting tracking and information signal 107a which is then capable of being received by modules 74a and 74b.

Portable device 100 also comprises distance to spot measurement unit 108 as well as gravity directed ultrasonic vertical distance to ground measurement unit 109 mounted in a conventional gimbal. Distance measurement unit 108 is capable of emitting visible focused energy beam 108a which, when directed at a lumber unit such as 10, is capable of creating projected spot 121 on the surface of units such as 10 and of measuring the distance to spot 121. Distance measurement devices, such as laser range finders, are well known in the art. Vertical distance measurement unit 109 uses a conventional gimbal to allow omni-directional rotation under the force of gravity to direct its ultrasonic signal emitter in the downward direction. Unit 109 further emits ultrasonic signal 109a towards the ground from which it then receives back signal 109a's reflections. Unit 109 uses ultrasonic signal 109a and its reflection to calculate the distance from observation point 120, within device 100, to the nearest ground point directly beneath device 100. Device 100 additionally comprises image capture unit 110, such as a conventional CCD camera. Unit 110 is capable of capturing images of objects within field of view 110a such as unit 10, which are currently in the line of site as marked by projected spot 121. Finally, device 100 further comprises housing 102 which holds keyboard 103, microphone 104, speaker 105 and LCD 106.

Figure 2:
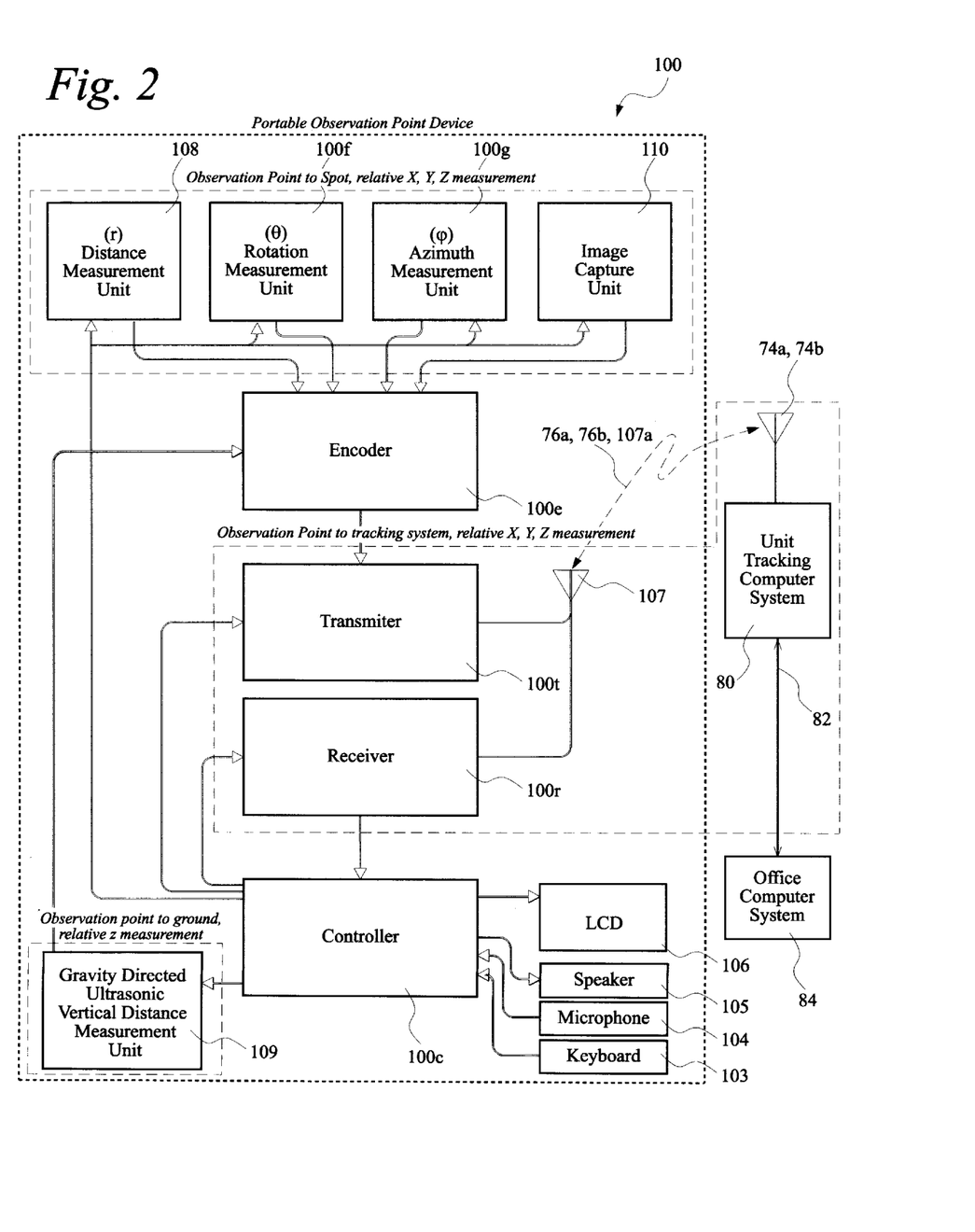
FIG. 2 is a block diagram of the present invention showing its electronic circuit.

Referring now to FIG. 2, there is shown a block diagram of the electronic circuit of device 100. Controller 100c receives input from keyboard 103 and microphone 104 and communicates to the operator through speaker 105 and LCD 106. Distance measurement unit 108 passes obtained distance information to encoder 100e which also receives rotation information from rotation measurement unit 100f and tilt information from azimuth measurement unit 10g. Units 108, 100f and 100g determine the polar coordinates of the projected spot with respect to observation point 120 within device 100. Image capture unit 110 also passes captured images to encoder 100e. Encoder 100e then passes translated information to transmitter 100t which further communicates this information as signal 107a via tracking antenna 107 to locating modules 74a and 74b. These signals are then communicated to unit tracking computer system 80, which in turn communicates them over wire 82 to office computer system 84. Computer systems 80 and 84 are also capable of transmitting information as represented by signals 76a and 76b via modules 74a and 74b to receiver 100r via antenna 107. Receiver 100r then passes this information to, and receive commands from, controller 100c. Controller 10c also outputs commands to transmitter 100t, distance measurement unit 108, rotation measurement unit 100f and azimuth measurement unit 100g.

First Operation

The present invention is intended to work in conjunction with an object tracking system such as that described by the present inventors in their application for an Automated Lumber Unit Tracking System. In this invention, it was shown that the location of objects such as units of lumber could be uniquely tracked within a prescribed area as they were transported about by a vehicle such as a fork lift. Hence, a unit tracking computer system such as 80 and an office computer system such as 84, as depicted in FIGS. 1 and 2, can be employed to track the current locations of units of lumber such as 10 and to associate with these current coordinates selected meaningful information about unit 10. As will be described in the ensuing text, the operation of the present invention will allow the yard man to recall selected pertinent information regarding desired units of lumber by simply "spoting" them with the present invention which itself is being tracked by a system similar to that which is employed to track the lumber units.

Referring to FIG. 1, the unit tracking computer system 80 automatically tracks and records the exact location of each and every unit, such as 10, being transported by a fork lift about a lumber yard or within any of its sheds. This positional information, when combined with the known physical size of each individual unit, includes the entire area taken up by the unit's volume. The physical size can be determined by using a device similar to the Automated End Tally System, as patented by the present inventors. This device is not only capable of determining the actual tally count of boards within a given unit, but it can also determine the actual size of the unit itself based upon the unit's scanned end topologies. The unit tracking computer system 80 extrapolates the actual coordinates of the corners of the rectangular volume of each unit from the exact position of the forks when the unit was disengaged and the known size of the unit.

Referring to FIGS. 1 and 2, operation of the portable device 100 commences when a yard man enters the prescribed area covered by the unit tracking computer system 80 and its network of locating modules similar to 74a and 74b. Once within this area, device 100 is itself constantly tracked in a means similar to that described by the Automated Lumber Unit Tracking System patent for tracking fork lifts. Hence, at any given moment, at least the exact relative X-Y location of observation point 120 within device 100 is known by tracking computer system 80. Although a modified triangulation tracking system could be relied upon to also calculate the current Z coordinate of device 100, the present invention will rely upon gravity directed ultrasonic vertical distance measurement unit 109 to emit signal 109a directly towards the ground below device 100. Unit 109 will then receive back the reflections of signal 109a, thereby calculating the distance between observation point 120 and the ground.

Eventually, it is anticipated that the yard man will point device 100, and therefore distance measurement unit 108, at a lumber unit such as 10. As he points device 100, it will be rotated and tilted about observation point 120. As is well known in the art, a conventional electronic compass may be employed within the rotation measurement unit 100f to ascertain device 100's exact rotation about the reference north-south vertical plane. Furthermore, a conventional electronic level may be employed within azimuth measurement unit 100g to ascertain device 100's exact tilt off the reference horizontal plane. Also well known within the art, a conventional laser range finder may be employed by measurement unit 108 to project a visible beam 108a upon the desired unit such as 10. Once projected, beam 108a will then create a visible spot 121 on the desired unit and distance measurement unit 108 automatically calculates the distance to spot 121. The operator will then either speak a command into microphone 104 or enter a command into keyboard 103 which will then be electronically translated and passed to controller 100c. This command will direct controller 100c to identify the presently "spotted" unit in which case controller 100c will then pass signals to distance measurement unit 108, rotation measurement unit 100f, and azimuth measurement unit 100g, instructing each of them to transmit their current readings to encoder 100e. At this time controller 100c will also direct vertical distance measurement unit 109 to emit ultrasonic signal 109a for the purposes of measuring the current distance from observation point 120 to ground. This measurement will then also automatically be passed from unit 109 to encoder 100e. Encoder 100e then translates these separate measurements into a defined information protocol and transmits them to transmitter 100t. Under the direction of controller 100c, transmitter 100t then communicates to unit tracking computer system 80 via signal 107a the exact location of observation point 120 with resect to device 100 and the relative measurement information just captured from observation point 120 to projected spot 121.

Tracking computer system 80 then uses this information to extrapolate the relative X-Y-Z location of projected spot 121. Computer 80 then correlates this extrapolated position with the last known locations of all previously inventoried and tracked units, such as 10. These locations are stored as the separate X-Y-Z coordinates of each of the eight corners of any given lumber unit. The X-Y-Z coordinate of spot 121 will be found to substantially lie within one of the four to five exposed surfaces of the desired unit. Hence, each exposed surface, such as the two sides or ends of unit 10, form a plane defined by the coordinates of its corner points. Computer system 80 will expand the plane defined by the corners of a given side into a larger rectangular volume to encompasses more space than occupied by the unit's side itself. By checking its database for the proximity of other units similar to 10, known to be neighbors of the surface under consideration, computer 10 can selectively increase or decrease the expanded volume as needed to help uniquely identify the unit surface. Using these calculations, computer 80 will attempt to place projected spot 121 within an expanded surface as defined by the coordinates of the four corners plus an expansion factor. If computer 80 is unable to do this, it will then transmit back to device 100, via signals 76a and 76b, instructions to be output via speaker 105 and/or LCD 106, directing the operator to move the spot either left, right, up or down upon the desired surface after which an second spot reading may be taken. This process can be repeated as necessary until the coordinates of spot 121 are conclusively placed within one of the expanded surfaces of a single unit similar to 10.

Once tracking computer 80 has identified the desired unit such as 10, it then communicates a unique electronic specification for the unit to office computer system 84. System 84 then feeds back to computer 80 all known and pertinent information about the identified unit such as specie, grade, thickness, width, length, dryness, surfacing, mill, received date, and other inventory related information. Computer 80 then transmits this information to device 100 via modules 74a and 74b. Antenna 107 inputs the transmitted inventory information and outputs this information to receiver 100r. Receiver 100r then demodulates and outputs the data to controller 100c. Controller 100c subsequently outputs the information via either or both speaker 105 and LCD 106 to the yard main, depending upon his preference. It is anticipated that the yard man may subsequently desire additional information concerning the identified unit, or may wish to update the unit's information base within office computer system 84. In either case, it is well known to anyone skilled in the art that information either spoken or entered on the keyboard by the operator may then be transmitted to office computer 84 via established communication links as previously described after which further responses from computer 84 may be received by device 100 and output to the yard man.

As discussed earlier in the background section, an additional function of portable device 100, is to help direct the yard man to a desired unit. It is anticipated that the yard man will either speak or enter using the keyboard, selection criteria indicating the desired unit(s). For example he may enter a specie code for red oak, a thickness code for 4/4 and a grade code of "FAS". Once this information is input, controller 100c will then direct the communication of this selection criteria to office computer system 84 via the previously specified communication links. Once received, computer system 84 may then suggest one or more units fitting the desired criteria. System 84 then communicates the unique electronic specification for the possible units to unit tracking computer system 80 which then inquires into its database of current unit locations for each of the possible units. Based upon the current position of device 100, tracking computer 80 may then direct the yard man left, right, forward and/or backwards, with either or both spoken or displayed directions, until the yard man has reached the nearest unit matching the desired criteria. It is anticipated that the operator may then use device 100 to project spot 121 upon what he perceives to be matching units based upon the communicated instructions, after which the aforementioned system will either confirm or reject the spotted unit.

Often enough, one or more units in a stack may tip and fall over to the ground. When this happens the banding on the units may break and the boards may mix with other fallen units. In this case, the portable observation point device 100 may operate in a slightly different mode to help identify the fallen units. To do this, the yard man would simply hold device 100 somewhere within the "space" of where one of the fallen units was suspected to have been. At this point a slightly different procedure is executed when the yard man either enters the appropriate key sequence or speaks the appropriate command. Controller 100c then follows a similar process as discussed above except that it disables measurement units 108, 100f and 100g from providing input to encoder 100e. Hence, the currently known coordinates of observation point 120 are used instead of those of projected spot 121 for the purposes of the identification of the fallen unit. Encoder 100e will also transmit a special code indicating that the spatial matching algorithms should now pressume that spot 121 is within a unit, rather than on one of its outer surfaces. All other functionality is identical to that previously described. It should be noted that in any case, once a unit such as 10 is identified, the yard man may then simply move from unit to unit to view its pertinent information by looking at LCD 106 and moving the right, left, up and down arrows keys on keyboard 103. In such cases the unit tracking computer system 80 is working in conjunction with the office computer system 84 to provide visual information as to what has been tracked to be on either side as well as above and below the currently identified unit. Hence, this visual display may then be navigated by the yard man using the arrow keys or spoken commands rather than having to point at each unit in question.

In the cases where a particular unit such as 10 has not yet been tracked by computer system 80, the present invention may optionally be used to classify such units. This is accomplished when the yard man uses device 100 in a manner similar to that described above to project spot 121 on the desired unit after which tracking system 80 feeds back to the operator that unit 10's identity is not known and that nothing else has been determined to occupy that unit's measure location. The operator may then either enter a command using keyboard 103 or microphone 104 to direct image capture unit 110 to capture the current image as sensed by the CCD camera within field of view 110a. The yard man may then also use either keyboard 103 or microphone 104 to enter a uniquely identifying indicia, if there is one, for this particular unit 10. This unique indicia as well as the captured image and the units location, are then transmitted by antenna 107 to tracking system 80 for classification in its database. Hence, computer system 80 is now tracking previously unknown unit 10 and may then communicate this same location and identity information to office computer system 84. Office computer 84 may have additional information associated with the units indicia such as unit 10's current size as last determined when the unit was end tallied using a device similar to the Automated End Tally System. This unit size information is then passed back to tracking system 80 which may in turn use it to complete the location information with respect to unit 10's other surfaces for which an image was not captured. At this point, unit 10 is now available for identification by device 100 in the same way as all other units are that have been tracked by a Automated Lumber Unit Tracking System similar to that proposed by the present inventors.

Alternate Second Operation of the present invention

Background

The primary manufacturers of lumber are sawmills who purchase their lumber in log form. When the logger brings in a truck load of logs to a mill, each log must be evaluated so that a price may be set. This evaluation typically consists of determining the specie and grade of each log as well as the logs rough total board footage, referred to as its scale. To calculate scale, the mill operator measures the average diameter of the smaller end of the log and multiplies this times the log's length. In the current state of the ark this is a manual process that is both time consuming and somewhat inaccurate. The present invention as specified is capable of automatically scaling logs for the mill operator thereby saving time while also increasing accuracy.

After a load of logs have been graded and scaled, the mill operator will then typically store all of the logs from the same purchase together in segregated rows. Eventually, the operator will then mill some or all of the logs from a given purchase into individual boards which are then graded, tallied, packaged and sent to a wholesaler. During this milling process, the mill operator is desirous of knowing what the yield of boards ended up to be from any given purchase load of logs. This is not always easy to determine because very often logs from different purchase lots end up being mixed together to help maximize the efficiencies of the mill. What is needed is an easy method to uniquely identify each log as it is about to be milled which would then allow for a yield analysis down to the actual log. The present invention offers the additional benefit of uniquely classifying each and every log based upon the image that is captured of the given logs smaller end when it is automatically scaled. Using this image database of all log ends, it is then possible to use a camera to capture the images of logs about to be milled and to match this image with the existing images previously captured by the present invention. The mills computer system would then be aware of all pertinent information concerning each log about to be milled, such as the logger and received date. This information would then be joined up with the yield of the log which is determined after milling.

Alternate Specification

Figure 3:
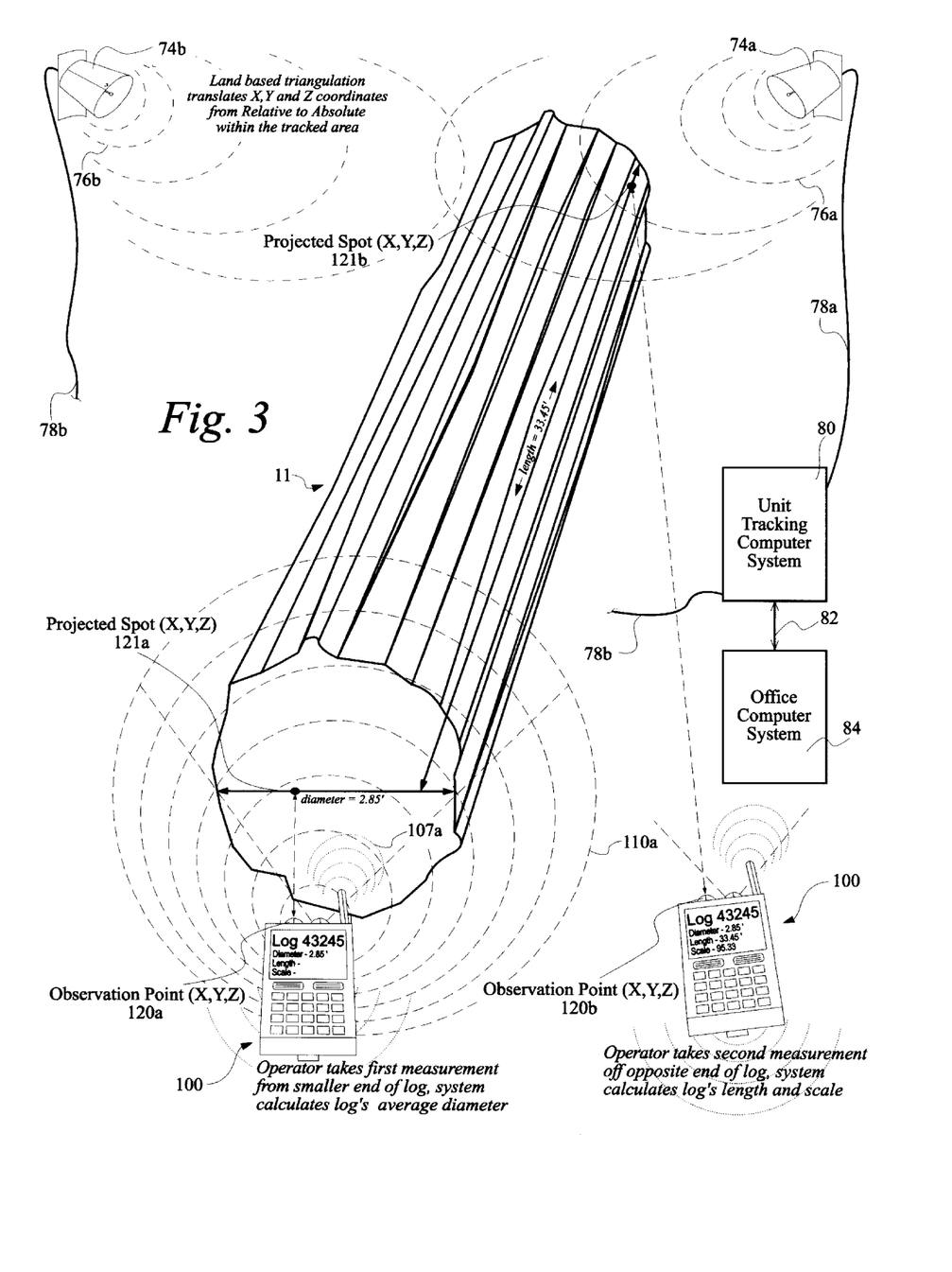
FIG. 3 is a perspective diagram of the present invention alternatively being used to measure the diameter and length of a log, from which it may then calculate the log's scale and classify the log.

The construction and circuitry of the present invention as already specified is capable of providing the necessary functions to automatically scale and classify logs. Referring to FIG. 3, there is shown a perspective drawing of log 11 from which device 100 is being used by the operator to take two separate measurements. The first measurement is from observation point 120a to projected spot 121a, while the second measurement is from observation point 120b to projected spot 121b. Also depicted is office computer system 84 which is capable of bi-directional communications with unit tracking computer system 80 via data link 82. Tracking computer system 80 further connects with two or more stationary elevated locating modules such as 74a and 74b, via wires 78a and 78b respectively. Modules 74a and 74b are constantly emitting tracking and information signals 76a and 76b which are then capable of being received by device 100 as previously described. Device 100 itself is also capable of emitting tracking and information signal 107a which is then capable of being received by modules 74a and 74b. In all ways device 100 is exactly similar in construction as previously described in the specification of the preferred embodiment.

Alternate Second Operation

Referring to FIGS. 2 and 3, the alternate operation begins when the operator points device 100 at the smaller end of log 11 such that spot 121a is visible somewhere on the log's end surface. The operator then initiates the classification function by either using device 100's keyboard or microphone. In this function, controller 100c directs unit 110 to capture the current image from the CCD camera and to pass that image to encoder 100e. This information is then combined with the location information determined by distance measurement unit 108, rotation measurement unit 100f and azimuth measurement unit 100g and passed from encoder 100e to transmitter 100t. Under the direction of controller 100c, this information is then transmitted via antenna 107 as signal 107a to be received by modules 74a and 74b. The information is then passed to tracking computer 80 which calculates the location of spot 121a in a manner exactly similar as previously described in the first operation. In addition, tracking computer 80 will now also calculate the average diameter of the log end using standard image analysis techniques which are well known to those who are skilled in the art. Computer 80 then transmits the log end's location, average diameter and image to office computer system 84 via link 82. Office system 84 then adds the present log 11 to its database and assigns it a new tracking code which it then passes back to computer 80 and ultimately to device 100 for display on its screen to the operator.

The operator will then move to a position off to the side of log 11 so that a second set of measurements may be taken as represented by point 120b and spot 121b. For this measurement, the operator will use a command that does not direct device 100 to capture an image but rather to simply calculate the coordinates of spot 121b as previously described in the first operation. Ultimately, this second location of spot 121b will be used by tracking computer 84 in combination with the first measurement of spot 121a, to calculate the length of log 11. This length information is then transmitted to office computer 84 which then updates its relevant database and calculates the log's scale as equal to its average diameter times its length.

Note that at this point log 11 has been both measured for scale and uniquely classified for later reference. Hence, if the saw mill were to be outfitted with recognition cameras at the infeed to its saws, log 11 could be identified just prior to being cut into boards. This would further allow the mill operator to track the yield of his purchased lumber down to the individual log.

Conclusion, Ramifications, and Scope of Invention

In conclusion, it can be seen that the present invention has many advantages. For instance, it is capable of working with an existing unit tracking and office computer system to easily provide information concerning any given unit without requiring the operator to enter any indicia identifying the unit in question. The device is portable and by projecting a visible beam is able to identify "spotted" units which are otherwise difficult for the operator to reach. It may optionally be used to request information about units which have fallen and no longer occupy their last known location. It may also be used to lead the operator to a desired unit. The operator may give spoken commands rather than having to depress keys thereby increasing ease of use. And finally, with the ability to capture images, the present invention is capable of both analyzing the dimensions of and classifying units of lumber or logs which as of yet have not been identified to the companion tracking computer system.

It is evident from the description of the Portable System for Inventory Identification and Classification, that it has applicability beyond that of identifying tracked units of lumber. For example, lumber yards also handle plywood, large timbers and engineered wood product beams which are also moved via fork lift and may have their current locations constantly tracked. There are other industries, such as paper and metal, which handle large products which must be transported by fork lifts about geographical areas. Rolls of paper, metal I-beams, bundles of extruded bars, bundles of sheet metal, coils of steel, plates, etc. are all examples of such products. It is therefore considered that the Portable System for Inventory Identification and Classification is in general capable of working with any existing object tracking system. In fact, the objects do not have to be large enough to only be transported by fork lift and may, for example, be smaller pieces of steel which have been moved about by human hands which are either wearing special tracking gloves or wristbands.

It is also evident that there are other uses for the classification functions of the present invention. For example, the value of a particular plot of forest to a logger or mill is based upon the amount of lumber they anticipate that the forest will yield Before purchasing a new plot, the logger or mill will first attempt to inspect roughly two to three percent of the trees on the land. During this inspection they will use large calipers to help measure each trees average diameter and they will use range finders to determine the height of a tree at the point at which its top will be cut off to form the log. This current process is very time consuming. The present invention in its current form could be used to automatically measure this same information in a much more efficient and accurate way. This would be done by first setting up a portable tracking system and then using the hand held device to first point to the base of the tree and then the point of the tree where the top will be cut off. This will allow the present invention to not only automatically scale each tree but also to record its visual image and exact location. And since this same information can be gathered more efficiently than with current methods, more of the same plot of forest can be measured in the same amount of time. This increased measurement should help the logger or mill operator to better estimate the true yield of the land and therefore to provide a better bid.

Furthermore, it is also evident that the novelty of the present invention is not dependent upon the particular embodiments of its parts. For instance, instead of using a ground based triangulation approach to tracking, a conventional Global Positioning Satellite (GPS) system could be employed. In such a case, the GPS system at its fullest accuracy would be capable of determining the X-Y-Z coordinates of the portable device's observation point without needing the separate ultrasonic vertical distance measurement unit to measure the Z distance of the device off of the ground below. What is important is that the X-Y-Z coordinate is first determined for the observation point so that it may then be used as a basis for extrapolating to the coordinates of the spot. The particulars of how this is determined should not be construed as limitations on the present invention. Also, while the present state of the art in electronic compasses and tilt measurement devices have been employed in the present invention, these particular components may evolve.

Thus the reader will see that the Portable System for Inventory Identification and Classification embodies the following five basic capabilities:

1. The ability to establish the current three dimensional coordinates of an observation point within a portable device with reset to a fixed coordinate system;
2. the ability to project a visible spot from the observation point device to an object of interest under the control of an operator,
3. the ability to determine the coordinates of the projected spot relative to the location of the observation point within the portable device;
4. the ability to extrapolate from the coordinates of the observation point to those of the projected spot and then to inquire upon a tracking system to determine which object was known to last exist at these extrapolated coordinates; and
5. the ability to capture an image of the object centered around the projected spot, the image and location of which may then be used to both analyze and classify the object Note that the first three capabilities of the present invention have many uses by themselves without the need to have the portable observation point device work in conjunction with an object tracking system. For example, when multiple spot locations are measured on the same object, the present invention could begin to construct a surface image of the inquired upon object. This could be especially useful for emergency workers who are attempting to ascertain information about collapsed structures. If the device was further equipped with the ability to generate different frequencies to be used for distance measurement, it could in effect "see through" selected materials which visually block emergency workers from seeing pertinent structural supports or impediments.

Alternatively, the device could also be of use to mountain climbers who need to judge the relative distances and shapes of portions of cliff they will soon be attempting to scale. Again, by using different frequencies, the unit can effectively "see through" such materials as snow and ice which may appear to be solid but in fact would not support a person's weight. Hence, the device could take the place of manual prodding sticks used to poke at the snow in front of a climber to help them avoid dangerous pockets. As can be seen by those skilled in the art, the Portable System for Inventory Identification and Classification may either interact with an object tracking system to help locate, identify and/or classify objects by location, or it may act alone to measure randomly surfaced objects, such surfaces having one or more layers with only the outer layer being visible to the human eye. Other uses are apparent. Accordingly, the scope of the invention should be determined not by the embodiments illustrated, but rather by the appended claims and their legal equivalents.

We claim:

1. An portable system for remotely determining the absolute coordinates of a point on an object, said point being defined by the reflection of an energy beam incident onto said object at said point, comprising:

means for projecting from said portable system said energy beam onto said object;

means for receiving said reflection of said energy beam from said object;

means for determining the relative coordinates of said point with respect to said portable system, means for determining the absolute coordinates of said portable system, and means for computing said absolute coordinates of said point from said relative coordinates of said point and said absolute coordinates of said portable system.

2. The invention of claim 1 wherein said energy beam comprises focused laser radiation.

3. The invention of claim 1 wherein said means for projecting from said portable system said energy beam onto said object comprises:

means for producing said energy beam, and means for focusing said energy beam onto said object.

4. The invention of claim 1 wherein said means for receiving said reflection of said energy beam from said object comprises:

means for focusing said reflection of said energy beam, and means responsive to said focused reflection of said energy beam for producing an electrical signal.

5. The invention of claim 1 wherein said means for computing said absolute coordinates of said point from said relative coordinates of said point and said absolute coordinates of said portable system comprises:

means for vectorially adding said relative coordinates of said point with respect to said portable system with said absolute coordinates of said portable system.

6. The invention of claim 1 wherein said means for determining the absolute coordinates of said portable system comprises:

triangulation means for determining the absolute X-Y coordinates of said portable system, and means for determining the absolute Z height coordinate of said portable system.

7. The invention of claim 6 wherein said triangulation means for determining the absolute X-Y coordinates of said portable system comprises a global positioning satellite system (GPS).

8. The invention of claim 6 wherein said means for determining the absolute Z height coordinate of said portable system comprises a gravity directed gimbaled ultrasonic distance measuring system.

9. The invention of claim 1 wherein said means for determining the relative coordinates of said point with respect to said portable system comprises:

means for determining the distance (r) from said point to said portable system;

means for determining the rotational angle ($\theta$) of said portable system with respect to a vertical reference plane, and means for determining the azimuth angle ($\phi$) of said portable system with respect to a horizontal reference plane.

10. The invention of claim 9 wherein said means for determining the distance (r) comprises a laser range (lidar) system.

11. The invention of claim 9 wherein said means for determining said rotational angle ($\theta$) comprises an electronic compass.

12. The invention of claim 9 wherein said means for determining said azimuth angle ($\phi$) comprises an electronic level.

13. A portable system for remotely determining the relative coordinates of a point on an object with respect to said portable system, said point being defined by the reflection of an energy beam incident onto said object at said point, comprising:

means for projecting from a known observation point within said portable system said energy beam onto said object;

means for determining the rotational angle ($\theta$) and the azimuth angle ($\phi$) of said projected beam with respect to said observation point;

means for receiving said reflection of said energy beam from said object;

means for determining the distance from said observation point to said reflection point, and means for calculating the relative coordinates of said reflection point with respect to said observation point based upon said angles and said distance.

14. The invention of claim 13 wherein said means for projecting from a known observation point within said portable system said energy beam onto said object comprises:

means for producing said energy beam at know observation point, and means for focusing said energy beam onto said object.

15. The invention of claim 13 wherein said means for determining said rotational angle ($\theta$) comprises an electronic compass.

16. The invention of claim 13 wherein said means for determining said azimuth angle ($\phi$) comprises an electronic level.

17. The invention of claim 13 wherein said means for receiving said reflection of said energy beam from said object comprises:

means for focusing said reflection of said energy beam, and means responsive to said focused reflection of said energy beam for producing an electrical signal.

18. The invention of claim 13 wherein said means for determining the distance from said observation point to said reflection point comprises a laser range (lidar) system.

19. The invention of claim 13 wherein said means for calculating the relative coordinates of said reflection point with respect to said observation point based upon said angles and said distance comprises:

means for determining the distance (r) from said reflection point to said observation point;

means for determining the rotational angle ($\theta$) of said observation point with respect to a vertical reference plane, and means for determining the azimuth angle ($\phi$) of said observation point with respect to a horizontal reference plane.

20. The invention of claim 19 wherein said means for determining the distance (r) comprises a laser range (lidar) system.

21. The invention of claim 19 wherein said means for determining said rotational angle ($\theta$) comprises an electronic compass.

22. The invention of claim 19 wherein said means for determining said azimuth angle ($\phi$) comprises an electronic level.

23. A portable system for remotely determining the absolute coordinates of a point on an object, said point being defined by the reflection of an energy beam incident onto said object at said point, comprising:

means for projecting from a known observation point within said portable system said energy beam onto said object;

means for receiving said reflection of said energy beam from said object;

means for determining the relative coordinates of said point of reflection with respect to said observation point;

means for determining the absolute coordinates of said observation point, and means for computing said absolute coordinates of said point of reflection from said relative coordinates of said point of reflection and said absolute coordinates of said observation point.

24. The invention of claim 23 wherein said means for projecting from a known observation point within said portable system said energy beam onto said object comprises:

means for producing said energy beam at said know observation point, and means for focusing said energy beam onto said object.

25. The invention of claim 23 wherein said means for receiving said reflection of said energy beam from said object comprises:

means for focusing said reflection of said energy beam, and means responsive to said focused reflection of said energy beam for producing an electrical signal.

26. The invention of claim 23 wherein said means for computing said absolute coordinates of said point of reflection from said relative coordinates of said point of reflection and said absolute coordinates of said observation point comprises:

means for vectorially adding said relative coordinates of said point of reflection with respect to said observation point with said absolute coordinates of said observation point.

27. The invention of claim 23 wherein said means for determining the absolute coordinates of said observation point comprises triangulation means for determining the absolute X-Y coordinates of said observation point, and means for determining the absolute Z height coordinate of said observation point.

28. The invention of claim 27 wherein said triangulation means for determining the absolute X-Y coordinates of said observation point comprises a global positioning satellite system (GPS).

29. The invention of claim 27 wherein said means for determining the absolute Z height coordinate of said observation point comprises a gravity directed gimbaled ultrasonic distance measuring system.

30. The invention of claim 23 wherein said means for determining the relative coordinates of said point of reflection with respect to said observation point comprises:

means for determining the distance (r) from said point of reflection to said observation point;

means for determining the rotational angle ($\theta$) of said point of reflection from said observation point with respect to a vertical reference plane, and means for determining the azimuth angle ($\phi$) of said of said point of reflection from said observation point with respect to a horizontal reference plane.

31. The invention of claim 30 wherein said means for determining distance (r) comprises a laser range (lidar) system.

32. The invention of claim 30 wherein said means for determining said rotational angle ($\theta$) comprises an electronic compass.

33. The invention of claim 30 wherein said means for determining said azimuth angle ($\phi$) comprises an electronic level.

34. An automatic means for identifying any object from within a group of objects, where the objects are not required to bear any identifying indicia, comprising:

means for determining the dimensions of the outer surfaces of said object before placing it within said group of objects;

means for determining the three dimensional coordinates and orientation of said object as it is placed in a stationary position within said group of objects;

means for creating a comparative database of said three dimensional coordinates and orientation, as well as said dimensions of said outer surfaces of all of said objects which have been placed within said group of objects;

means for projecting an energy beam from a known observation onto some point on said outer surfaces of one of said objects;

means for determining the relative three dimensional coordinates of said some point with respect to said observation point;

means for determining the absolute three dimensional coordinates of said observation point;

means for computing said absolute three dimensional coordinates of said some point from said relative coordinates of said some point and said absolute coordinates of said observation point, and means for determining from said comparative database said identity of said object within said group of objects, based upon said absolute three dimensional coordinates of said some point.

35. The invention of claim 34 wherein said means for determining the dimensions of the outer surfaces of said object before placing it within said group of objects means for scanning the outer surfaces of said object to determine said objects topology, and means for determining said objects outer dimensions from said topology.

36. The invention of claim 34 wherein said means for determining the three dimensional coordinates and orientation of said object as it is placed in a stationary position within said group of objects comprises means for tracking the current location of said object as it is engaged, transported and disengaged within a prescribed area by a transporting vehicle such as a fork lift.

37. The invention of claim 34 wherein said means for creating a comparative database of said three dimensional coordinates and orientation, as well as said dimensions of said outer surfaces of all of said objects which have been placed within said group of objects comprises:

computer means for translating said coordinates, said orientation and said outer dimensions of said objects into the separate X-Y-Z coordinates of each corner of said outer surfaces of said object, and computer means for associating said X-Y-Z coordinates of all of said corners which form a single outer surface of said object into a list of unique planes associated with said object.

38. The invention of claim 34 wherein said means for projecting an energy beam from a known observation point onto some point on said outer surfaces of one of said objects comprises:
   means for producing said energy beam at said know observation point, and
   means for focusing said energy beam onto said some point on said outer surfaces.

39. The invention of claim 34 wherein said means for computing said absolute three dimensional coordinates of said some point from said relative coordinates of said some point and said absolute coordinates of said observation point comprises:
   means for vectorially adding said relative coordinates of said some point with respect to said observation point with said absolute coordinates of said observation point.

40. The invention of claim 34 wherein said means for determining from said comparative database said identity of said object within said group of objects, based upon said absolute three dimensional coordinates of said some point comprises:
   computer means for algorithmically searching said comparative database based upon said absolute coordinates of said some point to determine upon which of said outer surfaces said some point was reflected from, and
   computer means for selectively retrieving said objects identity based upon said identified outer surface.

41. The invention of claim 34 wherein said means for determining the absolute three dimensional coordinates of said observation point comprises:
   triangulation means for determining the absolute X-Y coordinates of said observation point, and
   means for determining the absolute Z height coordinate of said observation point.

42. The invention of claim 41 wherein said triangulation means for determining the absolute X-Y coordinates of said observation point comprises a global positioning satellite system (GPS).

43. The invention of claim 41 wherein said means for determining the absolute Z height coordinate of said observation point comprises a gravity directed gimbaled ultrasonic distance measuring system.

44. The invention of claim 34 wherein said means for determining the relative coordinates of said some point with respect to said observation point comprises:
   means for determining the distance (r) from said some point to said observation point;
   means for determining the rotational angle ($\theta$) of said some point from said observation point with respect to a vertical reference plane, and
   means for determining the azimuth angle ($\phi$) of said of said some point from said observation point with respect to a horizontal reference plane.

45. The invention of claim 44 wherein said means for determining distance (r) comprises a laser range (lidar) system.

46. The invention of claim 44 wherein said means for determining said rotational angle ($\theta$) comprises an electronic compass.

47. The invention of claim 44 wherein said means for determining said azimuth angle ($\phi$) comprises an electronic level.

48. An automatic means for classifying an object, where the object is not required to bear any identifying indicia, comprising:

means for projecting from a known observation point within a portable system an energy beam onto said object;
   means for receiving the reflection of said energy beam off of said object;
   means for determining the relative coordinates of the point of reflection of said energy beam with respect to said observation point;
   means for determining the absolute coordinates of said observation point;
   means for computing said absolute coordinates of said point of reflection from said relative coordinates of said point of reflection and said absolute coordinates of said observation point;
   means for capturing an image of said object at said point of reflection;
   means for creating a comparative database of said three dimensional coordinates of said point of reflection and of corresponding said image of said object, and
   means for classifying said objects based upon said comparative database.

49. The invention of claim 48 wherein said means for projecting from a known observation point within a portable system an energy beam onto said object comprises:
   means for producing said energy beam at said know observation point, and
   means for focusing said energy beam onto said object.

50. The invention of claim 48 wherein said means for receiving the reflection of said energy beam off of said object comprises:
   means for focusing said reflection of said energy beam, and
   means responsive to said focused reflection of said energy beam for producing an electrical signal.

51. The invention of claim 48 wherein said means for computing said absolute coordinates of said point of reflection from said relative coordinates of said point of reflection and said absolute coordinates of said observation point comprises:
   means for vectorially adding said relative coordinates of said point of reflection with respect to said observation point with said absolute coordinates of said observation point.

52. The invention of claim 44 wherein said means for capturing an image of said object at said point of reflection comprises a CCD camera.

53. The invention of claim 48 wherein said means for creating a comparative database of said three dimensional coordinates of said point of reflection and of corresponding said image of said object comprises:
   computer means for calculating the average dimensions of said object based upon said captured image;
   computer means for storing said captured image and said calculated average dimensions indexed by said three dimensional coordinates of said point of reflection;
   computer means for associating one or more of said three dimensional coordinates which are related to said object;
   computer means for calculating distances between any of said one or more associated coordinates;
   computer means for determining the outer dimensions of said object based upon said calculated distances between any of said one or more associated coordinates;

means for assigning a tracking code to said one or more coordinates wherein said tracking code may act as a means of retrieving said coordinates and related said images and said calculated dimensions, and computer means for storing said outer dimensions and said calculated distances indexed with said tracking code.

54. The invention of claim 48 wherein said means for determining the absolute coordinates of said observation point comprises:

triangulation means for determining the absolute X-Y coordinates of said observation point, and means for determining the absolute Z height coordinate of said observation point.

55. The invention of claim 54 wherein said triangulation means for determining the absolute X-Y coordinates of said observation point comprises a global positioning satellite system (GPS).

56. The invention of claim 54 wherein said means for determining the absolute Z height coordinate of said observation point comprises a gravity directed gimbaled ultrasonic distance measuring system.

57. The invention of claim 48 wherein said means for determining the relative coordinates of the point of reflection of said energy beam with respect to said observation point comprises:

means for determining the distance (r) from said point of reflection to said observation point;

means for determining the rotational angle ($\theta$) of said point of reflection from said observation point with respect to a vertical reference plane, and means for determining the azimuth angle ($\phi$) of of said point of reflection from said observation point with respect to a horizontal reference plane.

58. The invention of claim 57 wherein said means for determining distance (r) comprises a laser range (lidar) system.

59. The invention of claim 57 wherein said means for determining said rotational angle ($\theta$) comprises an electronic compass.

60. The invention of claim 57 wherein said means for determining said azimuth angle ($\phi$) comprises an electronic level.

61. A method for remotely determining the absolute coordinates of a point on an object, said point being defined by the reflection of an energy beam incident onto said object at said point, comprising the steps of:

projecting from a portable system said energy beam onto said object;

receiving into said portable system said reflection of said energy beam from said object;

determining the relative coordinates of said point with respect to said portable system;

determining the absolute coordinates of said portable system, and computing said absolute coordinates of said point from said relative coordinates of said point and said absolute coordinates of said portable system.

62. The invention of claim 61 wherein said energy beam comprises focused laser radiation.

63. The invention of claim 61 wherein said step of projecting from said portable system said energy beam onto said object comprising the steps of:

producing said energy beam, and focusing said energy beam onto said object.

64. The invention of claim 61 wherein said step of receiving said reflection of said energy beam from said object comprising the steps of:

focusing said reflection of said energy beam, and producing an electrical signal responsive to said focused reflection of said energy beam for.

65. The invention of claim 61 wherein said step of computing said absolute coordinates of said point from said relative coordinates of said point and said absolute coordinates of said portable system comprising the steps of:

vectorially adding said relative coordinates of said point with respect to said portable system with said absolute coordinates of said portable system.

66. The invention of claim 61 wherein said step of determining the absolute coordinates of said portable system comprising the steps of:

using triangulation to determine the absolute X-Y coordinates of said portable system, and determining the absolute Z height coordinate of said portable system.

67. The invention of claim 66 wherein said using triangulation step of determining the absolute X-Y coordinates of said portable system comprises a global positioning satellite system (GPS).

68. The invention of claim 66 wherein said step of determining the absolute Z height coordinate of said portable system comprises a gravity directed gimbaled ultrasonic distance measuring system.

69. The invention of claim 61 wherein said step of determining the relative coordinates of said point with respect to said portable system comprising the steps of:

determining the distance (r) from said point to said portable system;

determining the rotational angle ($\theta$) of said portable system with respect to a vertical reference plane, and determining the azimuth angle ($\phi$) of said portable system with respect to a horizontal reference plane.

70. The invention of claim 69 wherein said step of determining the distance (r) comprises a laser range (lidar) system.

71. The invention of claim 69 wherein said step of determining said rotational angle ($\theta$) comprises an electronic compass.

72. The invention of claim 69 wherein said step of determining said azimuth angle ($\phi$) comprises an electronic level.

73. A method for remotely determining the relative coordinates of a point on an object with respect to a portable system, said point being defined by the reflection of an energy beam incident onto said object at said point, comprising the steps of:

projecting from a known observation point within said portable system said energy beam onto said object;

determining the relative angles of rotation and tilt of said projected beam from said observation point;

receiving into said portable system said reflection of said energy beam from said object;

determining the distance from said observation point to said reflection point, and calculating the relative coordinates of said reflection point with respect to said observation point based upon said angles and said distance.

74. The invention of claim 73 wherein said step of projecting from a known observation point within said portable system said energy beam onto said object comprising the steps of:

producing said energy beam at know observation point, and focusing said energy beam onto said object.

75. The invention of claim 73 wherein said step of determining said rotational angle ($\theta$) comprises an electronic compass.

76. The invention of claim 73 wherein said step of determining said azimuth angle ($\phi$) comprises an electronic level.

77. The invention of claim 73 wherein said step of receiving said reflection of said energy beam from said object comprising the steps of:

focusing said reflection of said energy beam, and producing an electrical signal responsive to said focused reflection of said energy beam.

78. The invention of claim 73 wherein said step of determining the distance from said observation point to said reflection point comprises a laser range (lidar) system.

79. The invention of claim 73 wherein said step of calculating the relative coordinates of said reflection point with respect to said observation point based upon said angles and said distance comprising the steps of:

determining the distance (r) from said reflection point to said observation point;

determining the rotational angle ($\theta$) of said observation point with respect to a vertical reference plane, and determining the azimuth angle ($\phi$) of said observation point with respect to a horizontal reference plane.

80. The invention of claim 79 wherein said step of determining the distance (r) comprises a laser range (lidar) system.

81. The invention of claim 79 wherein said step of determining said rotational angle ($\theta$) comprises an electronic compass.

82. The invention of claim 79 wherein said step of determining said azimuth angle ($\phi$) comprises an electronic level.

83. A method for remotely determining the absolute coordinates of a point on an object, said point being defined by the reflection of an energy beam incident onto said object at said point, comprising the steps of:

projecting from an observation point within a portable system said energy beam onto said object;

receiving into said portable system said reflection of said energy beam from said object;

determining the relative coordinates of said point with respect to said observation point;

determining the absolute coordinates of said observation point, and computing said absolute coordinates of said point from said relative coordinates of said point and said absolute coordinates of said observation point.

84. The invention of claim 83 wherein said step of projecting from a known observation point within said portable system said energy beam onto said object comprising the steps of:

producing said energy beam at said know observation point, and focusing said energy beam onto said object.

85. The invention of claim 83 wherein said step of receiving said reflection of said energy beam from said object comprising the steps of:

focusing said reflection of said energy beam, and producing an electrical signal responsive to said focused reflection of said energy beam.

86. The invention of claim 83 wherein said step of computing said absolute coordinates of said point of reflection from said relative coordinates of said point of reflection and said absolute coordinates of said observation point comprising the steps of:

vectorially adding said relative coordinates of said point of reflection with respect to said observation point with said absolute coordinates of said observation point.

87. The invention of claim 83 wherein said step of determining the absolute coordinates of said observation point comprises using triangulation to determine the absolute X-Y coordinates of said observation point, and determining the absolute Z height coordinate of said observation point.

88. The invention of claim 87 wherein said triangulation step of determining the absolute X-Y coordinates of said observation point comprises a global positioning satellite system (GPS).

89. The invention of claim 87 wherein said step of determining the absolute Z height coordinate of said observation point comprises a gravity directed gimbaled ultrasonic distance measuring system.

90. The invention of claim 83 wherein said step of determining the relative coordinates of said point of reflection with respect to said observation point comprising the steps of:

determining the distance (r) from said point of reflection to said observation point;

determining the rotational angle ($\theta$) of said point of reflection from said observation point with respect to a vertical reference plane, and determining the azimuth angle ($\phi$) of said of said point of reflection from said observation point with respect to a horizontal reference plane.

91. The invention of claim 90 wherein said step of determining distance (r) comprises a laser range (lidar) system.

92. The invention of claim 90 wherein said step of determining said rotational angle ($\theta$) comprises an electronic compass.

93. The invention of claim 90 wherein said step of determining said azimuth angle ($\phi$) comprises an electronic level.

94. A method for identifying any object from within a group of objects, where the objects are not required to bear any identifying indicia, comprising the steps of:

determining the dimensions of the outer surfaces of said object before placing it within said group of objects;

determining the three dimensional coordinates and orientation of said object as it is placed in a stationary position within said group of objects;

creating a comparative database of said three dimensional coordinates and orientation, as well as said dimensions of said outer surfaces of all of said objects which have been placed within said group of objects;

projecting an energy beam from a known observation point within a portable system onto some point on said outer surfaces of one of said objects;

determining the relative three dimensional coordinates of said point relative to said observation point, determining the absolute coordinates of said observation point;

computing said absolute coordinates of said point from said relative coordinates of said point and said absolute coordinates of said observation point, and determining from said comparative database said identity of said object within said group of objects, based upon said absolute three dimensional coordinates of said point of reflection.

95. The invention of claim 94 wherein said step of determining the dimensions of the outer surfaces of said object before placing it within said group of objects
   scanning the outer surfaces of said object to determine said objects topology, and
   determining said objects outer dimensions from said topology.

96. The invention of claim 94 wherein said step of determining the three dimensional coordinates and orientation of said object as it is placed in a stationary position within said group of objects comprises step of tracking the current location of said object as it is engaged, transported and disengaged within a prescribed area by a transporting vehicle such as a fork lift.

97. The invention of claim 94 wherein said step of creating a comparative database of said three dimensional coordinates and orientation, as well as said dimensions of said outer surfaces of all of said objects which have been placed within said group of objects comprising the steps of:
   translating said coordinates, said orientation and said outer dimensions of said objects into the separate X-Y-Z coordinates of each corner of said outer surfaces of said object, and
   associating said X-Y-Z coordinates of all of said corners which form a single outer surface of said object into a list of unique planes associated with said object.

98. The invention of claim 94 wherein said step of projecting an energy beam from a known observation point within a portable system onto some point on said outer surfaces of one of said objects comprising the steps of:
   producing said energy beam at said know observation point, and
   focusing said energy beam onto said some point on said outer surfaces.

99. The invention of claim 94 wherein said step of computing said absolute three dimensional coordinates of said some point from said relative coordinates of said some point and said absolute coordinates of said observation point comprising the steps of:
   vectorially adding said relative coordinates of said some point with respect to said observation point with said absolute coordinates of said observation point.

100. The invention of claim 94 wherein said step of determining from said comparative database said identity of said object within said group of objects, based upon said absolute three dimensional coordinates of said some point comprising the steps of:
   algorithmically searching said comparative database based upon said absolute coordinates of said some point to determine upon which of said outer surfaces said some point was reflected from, and
   selectively retrieving said objects identity based upon said identified outer surface.

101. The invention of claim 94 wherein said step of determining the absolute three dimensional coordinates of said observation point comprising the steps of:
   using triangulation to determine the absolute X-Y coordinates of said observation point, and
   determining the absolute Z height coordinate of said observation point.

102. The invention of claim 101 wherein said triangulation step of determining the absolute X-Y coordinates of said observation point comprises a global positioning satellite system (GPS).

103. The invention of claim 101 wherein said step of determining the absolute Z height coordinate of said observation point comprises a gravity directed gimbaled ultrasonic distance measuring system.

104. The invention of claim 94 wherein said step of determining the relative three dimensional coordinates of said some point with respect to said observation point comprising the steps of:
   determining the distance (r) from said some point to said observation point;
   determining the rotational angle ($\theta$) of said some point from said observation point with respect to a vertical reference plane, and
   determining the azimuth angle ($\phi$) of said of said some point from said observation point with respect to a horizontal reference plane.

105. The invention of claim 104 wherein said step of determining distance (r) comprises a laser range (lidar) system.

106. The invention of claim 104 wherein said step of determining said rotational angle ($\theta$) comprises an electronic compass.

107. The invention of claim 104 wherein said step of determining said azimuth angle ($\phi$) comprises an electronic level.

108. A method for classifying an object, where the object is not required to bear any identifying indicia, comprising the steps of:
   projecting from a known observation point within a portable system an energy beam onto said object;
   receiving into said portable system the reflection of said energy beam off of said object;
   determining the relative coordinates of the point of reflection of said energy beam with respect to said observation point;
   determining the absolute coordinates of said observation point;
   computing said absolute coordinates of said point of reflection from said relative coordinates of said point of reflection and said absolute coordinates of said observation point;
   capturing an image of said object at said point of reflection;
   creating a comparative database of said three dimensional coordinates of said point of reflection and of corresponding said image of said object, and
   classifying said objects based upon said comparative database.

109. The invention of claim 108 wherein said step of projecting from a known observation point within a portable system an energy beam onto said object comprising the steps of:
   producing said energy beam at said know observation point, and
   focusing said energy beam onto said object.

110. The invention of claim 108 wherein said step of receiving the reflection of said energy beam off of said object comprising the steps of:
   focusing said reflection of said energy beam, and
   producing an electrical signal responsive to said focused reflection of said energy beam.

111. The invention of claim 108 wherein said step of computing said absolute coordinates of said point of reflection from said relative coordinates of said point of reflection and said absolute coordinates of said observation point comprising the steps of:

vectorially adding said relative coordinates of said point of reflection with respect to said observation point with said absolute coordinates of said observation point.

112. The invention of claim 108 wherein said step of capturing an image of said object at said point of reflection comprises a CCD camera.

113. The invention of claim 108 wherein said step of creating a comparative database of said three dimensional coordinates of said point of reflection and of corresponding said image of said object comprising the steps of:

calculating the average dimensions of said object based upon said captured image;

storing said captured image and said calculated average dimensions indexed by said three dimensional coordinates of said point of reflection;

associating one or more of said three dimensional coordinates which are related to said object;

calculating distances between any of said one or more associated coordinates;

determining the outer dimensions of said object based upon said calculated distances between any of said one or more associated coordinates;

assigning a tracking code to said one or more coordinates wherein said tracking code may act as a means of retrieving said coordinates and related said images and said calculated dimensions, and storing said outer dimensions and said calculated distances indexed with said tracking code.

114. The invention of claim 108 wherein said step of determining the relative coordinates of the point of reflection of said energy beam with respect to said observation point comprising the steps of:

determining the distance (r) from said point of reflection to said observation point;

determining the rotational angle ($\theta$) of said point of reflection from said observation point with respect to a vertical reference plane, and determining the azimuth angle ($\phi$) of said of said point of reflection from said observation point with respect to a horizontal reference plane.

115. The invention of claim 114 wherein said step of determining distance (r) comprises a laser range (lidar) system.

116. The invention of claim 114 wherein said step of determining said rotational angle ($\theta$) comprises an electronic compass.

117. The invention of claim 114 wherein said step of determining said azimuth angle ($\phi$) comprises an electronic level.

118. The invention of claim 108 wherein said step of determining the absolute coordinates of said observation point comprising the steps of:

using triangulation to determine the absolute X-Y coordinates of said observation point, and determining the absolute Z height coordinate of said observation point.

119. The invention of claim 118 wherein said triangulation step of determining the absolute X-Y coordinates of said observation point comprises a global positioning satellite system (GPS).

120. The invention of claim 118 wherein said step of determining the absolute Z height coordinate of said observation point comprises a gravity directed gimbaled ultrasonic distance measuring system.

* * * * *